(12) United States Patent
Dockins et al.

(10) Patent No.: US 7,976,032 B1
(45) Date of Patent: Jul. 12, 2011

(54) PALLET JACK APPARATUS

(76) Inventors: Diangelo S. Dockins, Waddell, AZ (US); Stephanie Dockins, Waddell, AZ (US)

(*) Notice: Subject to any disclaimer, the term of this patent is extended or adjusted under 35 U.S.C. 154(b) by 275 days.

(21) Appl. No.: 12/417,328

(22) Filed: Apr. 2, 2009

(51) Int. Cl.
*B62D 21/14* (2006.01)
*B62D 33/08* (2006.01)

(52) U.S. Cl. ............... 280/43.12; 280/43.17; 280/43.23; 414/664; 414/667; 414/671; 187/229; 187/231; 187/237

(58) Field of Classification Search ............... 280/43.12, 280/43.16, 43.17, 43.22, 43.23; 108/51.11, 108/54.1; 414/667, 785, 490, 495, 664, 671; 187/237, 234, 229
See application file for complete search history.

(56) References Cited

U.S. PATENT DOCUMENTS

| | | | |
|---|---|---|---|
| 2,421,472 A * | 6/1947 | Way | 414/629 |
| 2,564,333 A * | 8/1951 | Kelly | 296/20 |
| 2,598,566 A * | 5/1952 | Max Lehmann | 187/229 |
| 2,877,868 A * | 3/1959 | Gunning et al. | 187/229 |
| 3,166,207 A * | 1/1965 | Quayle | 414/621 |
| 3,612,564 A * | 10/1971 | Harvey | 280/43.12 |
| 3,670,912 A * | 6/1972 | Dunbar | 414/420 |
| 3,905,632 A * | 9/1975 | Caylor et al. | 294/119.1 |
| 4,223,901 A * | 9/1980 | Klemick | 280/43.12 |
| 4,589,669 A * | 5/1986 | Kedem | 280/43.12 |
| 4,969,794 A | 11/1990 | Larsen | |
| 5,709,523 A * | 1/1998 | Ware | 414/715 |
| 6,808,357 B2 * | 10/2004 | Lee | 414/495 |
| 7,114,906 B1 | 10/2006 | Baumgarner et al. | |
| 7,237,645 B2 * | 7/2007 | Lohmann et al. | 180/332 |
| 7,641,011 B2 * | 1/2010 | Fridlington et al. | 180/68.5 |
| 2004/0151567 A1 * | 8/2004 | Magni | 414/664 |
| 2006/0181039 A1 | 8/2006 | Fridlington et al. | |
| 2008/0232944 A1 * | 9/2008 | Kim | 414/667 |
| 2009/0116945 A1 * | 5/2009 | White et al. | 414/667 |

FOREIGN PATENT DOCUMENTS

JP 06001598 A * 1/1994

* cited by examiner

*Primary Examiner* — Paul N Dickson
*Assistant Examiner* — James English
(74) *Attorney, Agent, or Firm* — Crossley Patent Law; Mark A. Crossley

(57) ABSTRACT

The pallet jack apparatus provides lateral fork adjustment between the two forks, each having a forwardly disposed pivoted wheel for added fork support. The lateral fork adjustment is controlled by the horizontal control lever on the stem. The lateral fork adjustment is via a motor with pinion gear which directly drives the first and second fork gears. The apparatus further provides height adjustment for the forks via the vertical control lever on the stem. The control levers are positioned within the handle interior of the oblong circular handle which guards against inadvertent control movements while providing superior leverage for positioning the apparatus.

3 Claims, 6 Drawing Sheets

PALLET JACK APPARATUS

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Several problems exist in the use of the plurality of pallet jacks provided in the past. Some pallet jacks do not provide for adjustment of spacing between lifting forks, thereby negating the use of a particular pallet jack when a pallet to be lifted does not match fork spacing. Of the pallet jacks provided that allow fork spacing adjustment, the methodology of adjustment is not as desirable as might be provided. For example, some pallet jacks allow a user to manually position forks laterally, yet forks are by necessity heavy, and manual adjustment is not only laborious and time consuming, but recognized as easily injurious to physical health, especially to lower backs. Still other pallet jack devices provide for a user to manually operate some form of fork adjustment, typically a practice that is time consuming and bothersome.

Some pallet jacks provide a relatively complex hydraulic design for lateral fork adjustment wherein a vertical stem is affixed to each fork and hydraulic forces are exerted against the vertical stem, whereby lateral adjustment is provided. This is an expensive design, requires extensive components and vertical stem housing, with stem supports, and is prone to eventual hydraulic leakage of lines and components. Chain drive mechanisms for fork separation are equally undesirable due to complexity and needs for lubrication and maintenance, and the requirements for housing, gear supports, and related extensive mechanical components. What has been needed is a pallet jack that provides fork height and separation adjustment by operation of levers, whereby no physical effort other than up or down lever movement initiates vertical and horizontal fork adjustment. Further, the apparatus should provide shielding of the adjustment controls against inadvertent operation while still providing easy control access. The apparatus should further provide a handle which provides for a plurality of gripping angles whereby an operator can easily manipulate the apparatus in movement to engage and disengage pallets. These features should be as basic as is possible in order to avoid failure and maintenance needs. The apparatus should also provide distal end fork support so that pallet loads are well distributed and supported. The present apparatus provides these advantages.

FIELD OF THE INVENTION

The pallet jack apparatus relates to pallet jacks and more especially to a pallet jack apparatus having basic hydraulic lift capability and electrical lateral fork adjustment.

SUMMARY OF THE INVENTION

The general purpose of the pallet jack apparatus, described subsequently in greater detail, is to provide a pallet jack apparatus which has many novel features that result in an improved pallet jack apparatus which is not anticipated, rendered obvious, suggested, or even implied by prior art, either alone or in combination thereof.

To attain this, the pallet jack apparatus is designed to convey a given pallet into, within, and out of a truck. An advantage is provided in handle design wherein the horizontal and vertical control levers are shielded from inadvertent operation while still allowing easy access for intended apparatus operation as well as superior leverage in positioning the apparatus. The substantially circular handle is slightly horizontally oblong and provides for ease of manipulation of the apparatus in positioning pallets and in positioning for pallet acquisition. The substantially diamond shaped rear platform is ideal for supporting the stem support without needless bulk.

The rear platform also provides strength where needed for the hydraulic assembly that raises and lowers the trapezoidal header, and with it the forks. The platform supports are slidingly engaged with the trapezoidal header and provide support and guidance for the header. The basic design of the hydraulic assembly and the lateral fork movement gears provides exact control of the apparatus without undue complexity and maintenance. The fork gears and pinion gear as arranged also negate the need for vertical stems on the forks.

Many features of the apparatus contribute to relative light weight, as compared to existing pallet jacks. The diamond shaped rear platform combined with the platform supports provides the needed strength, as noted, without excessive weight. The trapezoidal header provides the needed gear housing proximal to the header bottom, then tapers upwardly to conserve bulk and weight. The header cap is reduced in size toward the rear of the apparatus, providing the needed area for hydraulic assembly lift of the header and subsequently the forks, without unneeded mass. The pinion gear and related fork gears provide lateral fork adjustment with as little mass as is possible, as compared to existing chain drives, hydraulic drives, and even manually adjusted forks which require excessive mass. The fork wheels provide needed support for the front of the forks without having to engineer added strength and mass within the forks and header in order to support a load carried by the forks. The motor shaft is extended vertically downward from the motor within the trapezoidal header gear housing. The pinion gear is affixed directly to the shaft and directly drives the fork gears for lateral fork movement.

This relatively direct fork gear drive mechanism is important in saving weight and also maintenance requirements or repairs, as compared to more complex fork drive designs.

Thus has been broadly outlined the more important features of the improved pallet jack apparatus so that the detailed description thereof that follows may be better understood and in order that the present contribution to the art may be better appreciated.

An object of the pallet jack apparatus is to quickly and easily adjust lateral spacing between forks, without laborious manual effort.

Another object of the pallet jack apparatus is to quickly and easily adjust fork height.

A further object of the pallet jack apparatus is to avoid excessive hydraulic mechanisms.

An added object of the pallet jack apparatus is to provide lateral fork adjustment that is not prone to problems or failure.

Yet another object of the pallet jack apparatus is to negate the use of vertical fork extensions for fork spacing adjustments.

And, an object of the pallet jack apparatus is to shield the horizontal and vertical fork controls from inadvertent engagement while still allowing easy access to operation.

Still another object of the pallet jack apparatus is to be lightweight yet sturdy.

These together with additional objects, features and advantages of the improved pallet jack apparatus will be readily apparent to those of ordinary skill in the art upon reading the following detailed description of presently preferred, but nonetheless illustrative, embodiments of the improved pallet jack apparatus when taken in conjunction with the accompanying drawings.

In this respect, before explaining the current embodiments of the improved pallet jack apparatus in detail, it is to be understood that the pallet jack apparatus is not limited in its application to the details of construction and arrangements of the components set forth in the following description or illustration. Those skilled in the art will appreciate that the concept of this disclosure may be readily utilized as a basis for the design of other structures, methods, and systems for carrying out the several purposes of the improved pallet jack apparatus. It is therefore important that the claims be regarded as including such equivalent constructions insofar as they do not depart from the spirit and scope of the pallet jack apparatus. It is also to be understood that the phraseology and terminology employed herein are for purposes of description and should not be regarded as limiting.

DETAILED DESCRIPTION OF THE DRAWINGS

With reference now to the drawings, and in particular FIGS. 1 through 6 thereof, the principles and concepts of the pallet jack apparatus generally designated by the reference number 10 will be described.

Figure 1:
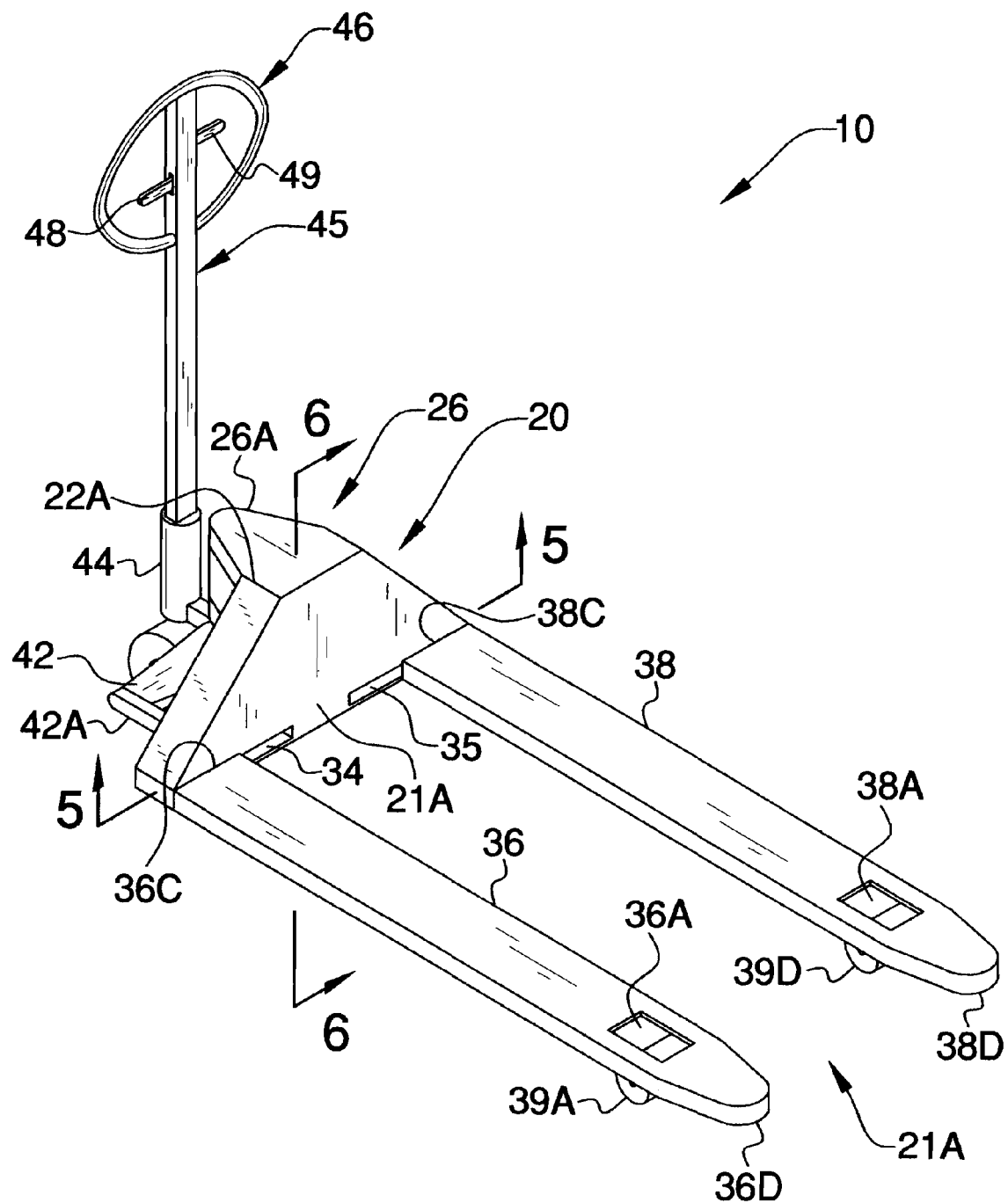
FIG. 1 is a top frontal perspective view.

Referring to FIG. 1, the pallet jack apparatus 10 provides a means for engaging and transporting a pallet. The forks comprising the first fork 36 and the second fork 38 move laterally to engage pallets of varying sizes and pallets having supports spaced apart in varying dimensions. The header cap 26 and trapezoidal header 20 move up and down in order to lift and lower a pallet via the forks.

Figure 5:
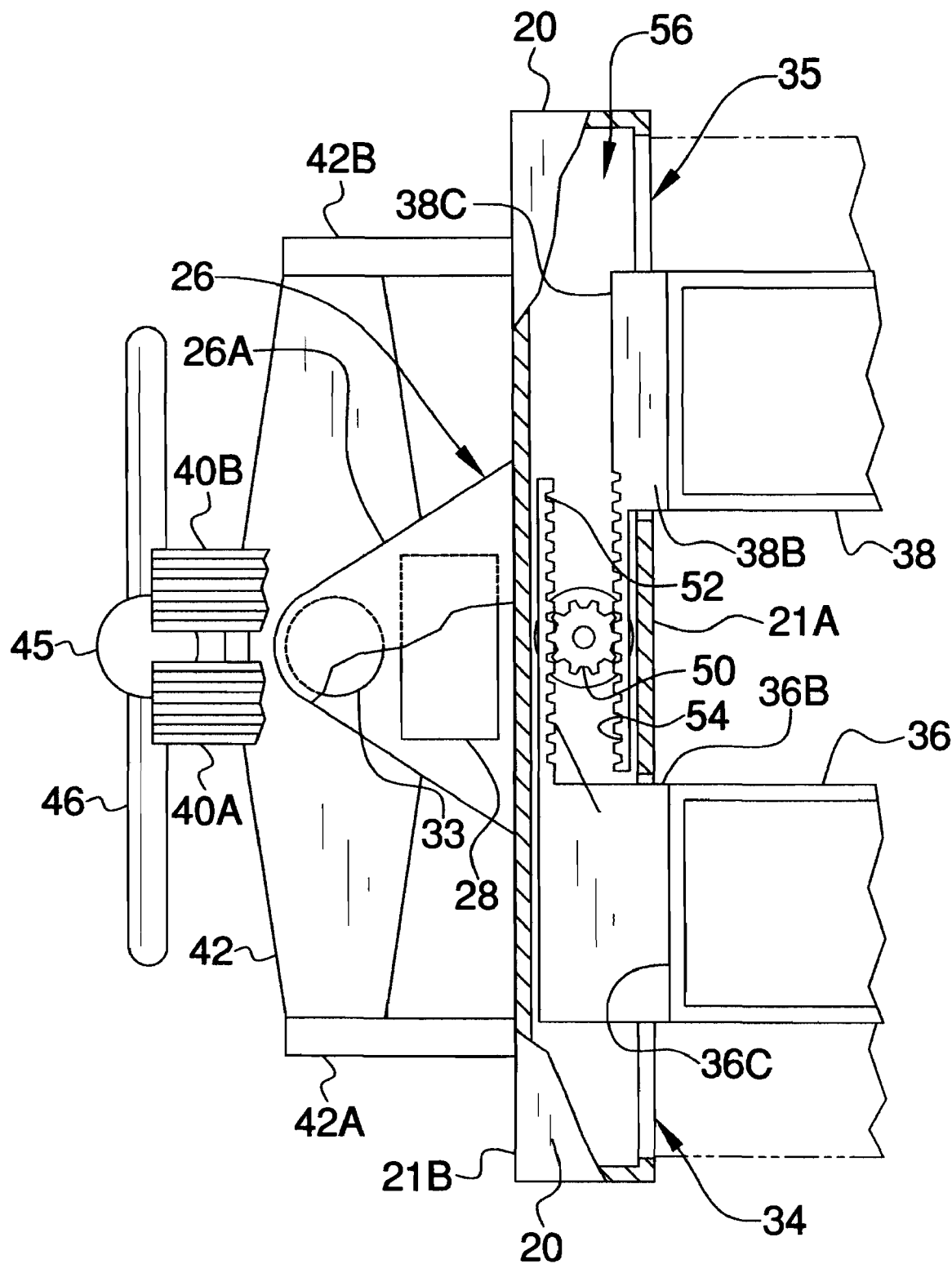
FIG. 5 is a partial top cross sectional view of FIG. 1, taken along the line 5-5.
Figure 6:
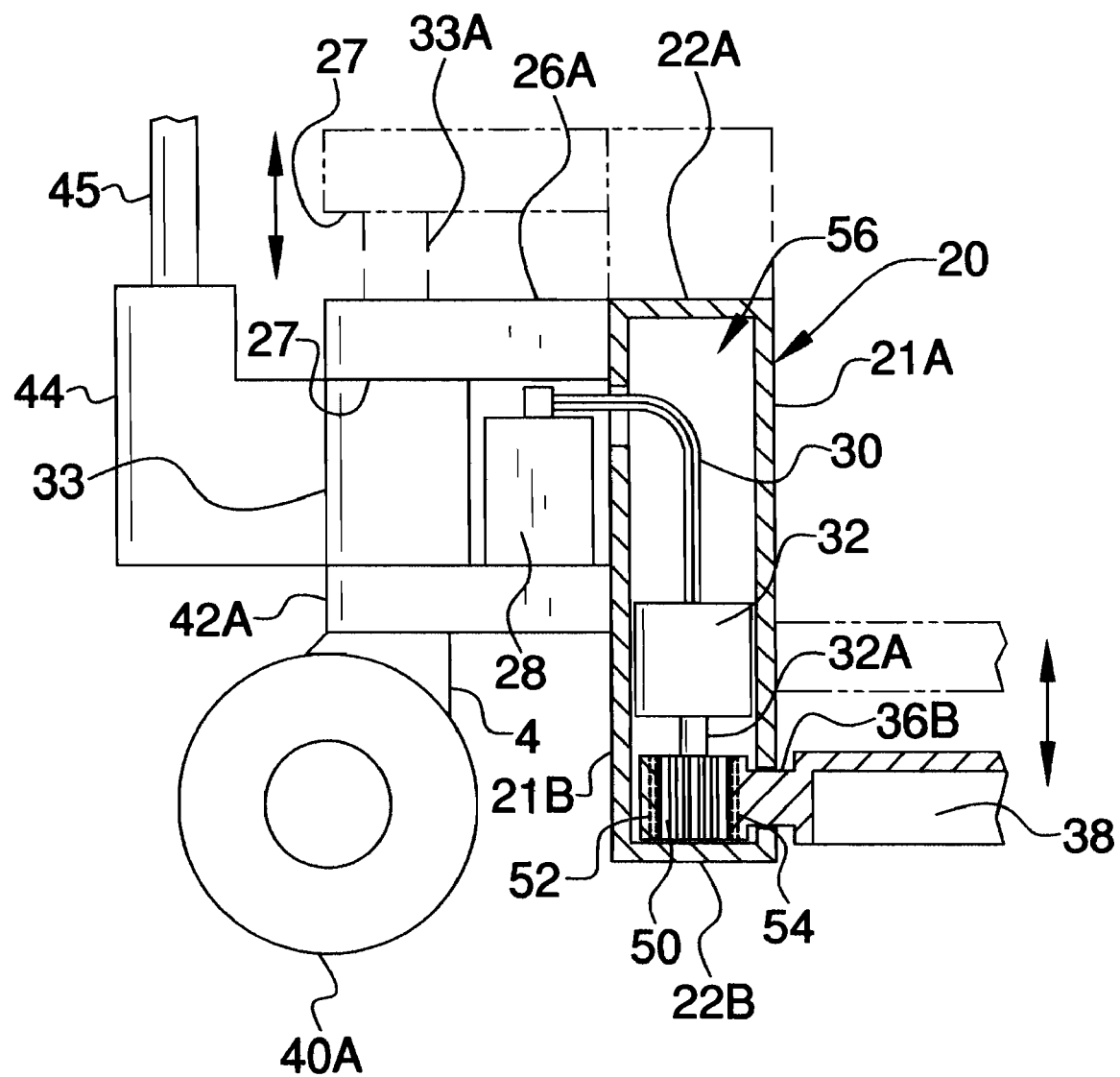
FIG. 6 is a partial lateral cross sectional view of FIG. 1, taken along the line 6-6.

Referring to FIGS. 5 and 6, the trapezoidal header 20 comprises a front 21a spaced apart from a rear 21b and a top 22a spaced apart from a bottom 22b. The gear housing 56 is disposed within the header 20. The pair of spaced apart slots is disposed within the header 20 front 21a. The slots are adjacent to the header 20 bottom 22b. The slots comprise the first slot 34 and the second slot 35. The motor 32 is vertically disposed within the gear housing 56. The motor 32 is proximal to the header 20 bottom 22b. The motor shaft 32a is extended vertically downward from the motor 32. The pinion gear 50 is affixed to the shaft 32a.

The first fork neck 36b is disposed rearwardly on the first fork first end 36c. The first fork neck 36b is slideably disposed within the first slot 34 of the trapezoidal header 20. The first fork gear 52 is disposed horizontally and medially on the first fork neck 36b within the gear housing 56. The first fork gear 52 is engaged with the pinion gear 50 in selective lateral adjustment of the first fork 36.

Figure 2:
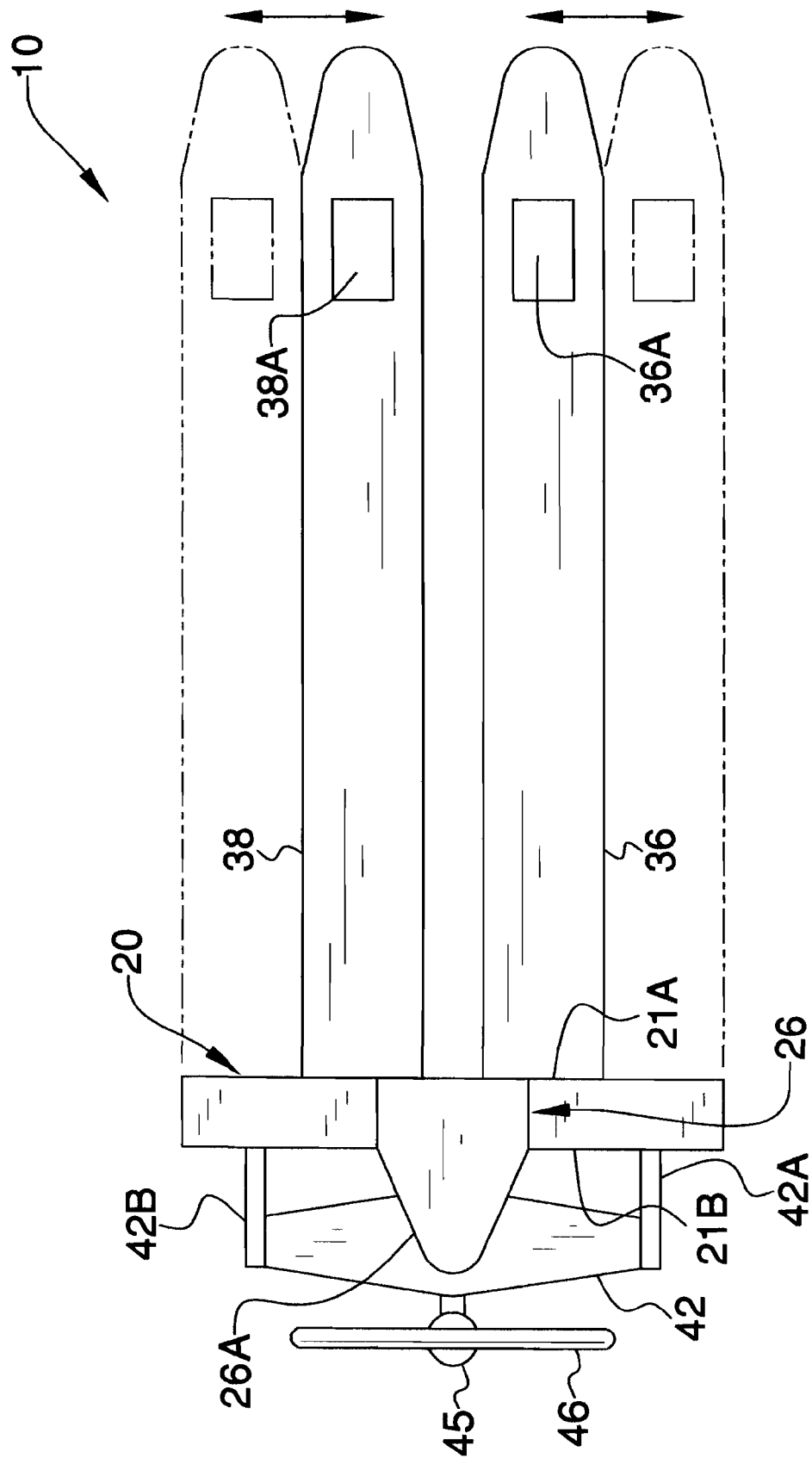
FIG. 2 is a top plan view.
Figure 3:
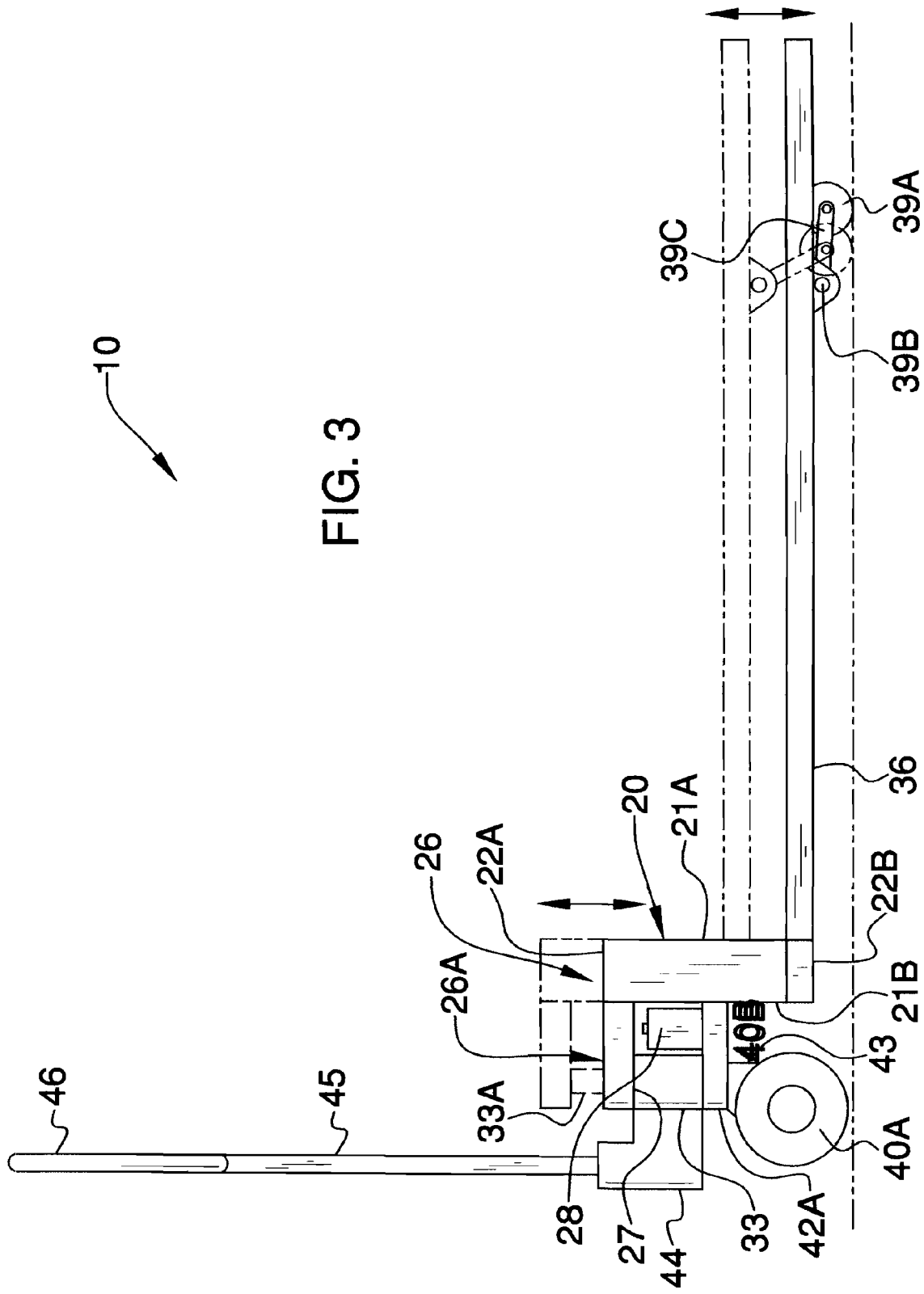
FIG. 3 is a lateral elevation view.

Continuing to refer to FIG. 5 and referring also to FIGS. 2 and 3, the first fork rounded end 36d is disposed on the first fork 36. The first fork rounded end 36d is opposite the first fork first end 36c. The first fork recess 36a is disposed proximal to the first fork rounded end 36d. The second fork neck 38b is disposed rearwardly on a second fork first end 38c. The second fork neck 38b is slideably disposed within the second slot 35 of the trapezoidal header 20. The second fork gear 54 is disposed horizontally and medially on the second fork neck 38b. The second fork gear 54 is engaged with the pinion gear 50 in selective lateral adjustment of the second fork 38. The second fork rounded end 38d is disposed on the second fork 38. The fork rounded ends prevent pallet damage and ease engagement with pallets. The second fork rounded end 38d is opposite the second fork first end 38c. The second fork recess 38a is disposed proximal to the second fork rounded end 38d. A pivot disposed on each fork. Each pivot is disposed rearwardly from each fork recess. The pivots comprise the first pivot 39b disposed on the first fork 36 and the second pivot disposed 39e (not shown) disposed on the second fork 38. A pivot arm is pivotally affixed to each pivot. The first pivot arm 39c is affixed to the first pivot 39b. The second pivot arm 39f (not shown) is affixed to the second pivot 39e. Both pivots are identical. Both pivot arms are identical.

The first fork wheel 39a is disposed on the end of the first pivot arm 39c opposite the first pivot 39b. The second fork wheel 39d is disposed on the end of the second pivot arm 39f opposite the second pivot 39e. The fork recesses provide a home for the fork wheels when the forks are in a fully down position. The header cap 26 is disposed atop the trapezoidal header 20 and extends rearwardly. The header cap 26 has a cap bottom 27. The header cap 26 further comprises the rearwardly extended triangular cap extension 26a. The pair of spaced apart horizontally disposed platform supports is slideably disposed against the rear 21b of the trapezoidal header 20. The supports comprise the first support 42a and the second support 42b. The substantially diamond-shaped rear platform 42 is disposed between the platform supports. The battery 28 is disposed atop the rear platform 42. The battery 28 is adjacent to the trapezoidal header 20 rear 21b. The battery 28 is in electrical communication with the motor 32 via wiring 30. The hydraulic cylinder assembly 33 is disposed atop the rear platform 42 in the wide region of the rear platform 42 diamond shape. The cylinder assembly 33 is rearward of the battery 28. The cylinder assembly 33 includes the piston 33a which is selectively driven upwardly. The piston 33a is engaged with the cap bottom 27 of the triangular cap extension 26a. The wheel support 43 is affixed downwardly to rear platform 42. The pair of spaced apart wheels is affixed to the wheel support 43. The wheels comprise the first rear wheel 40a and the second rear wheel 40b. The stem support 44 is L-shaped and is affixed rearwardly to the rear platform 42. The tubular stem 45 is disposed vertically within the stem support 44.

Figure 4:
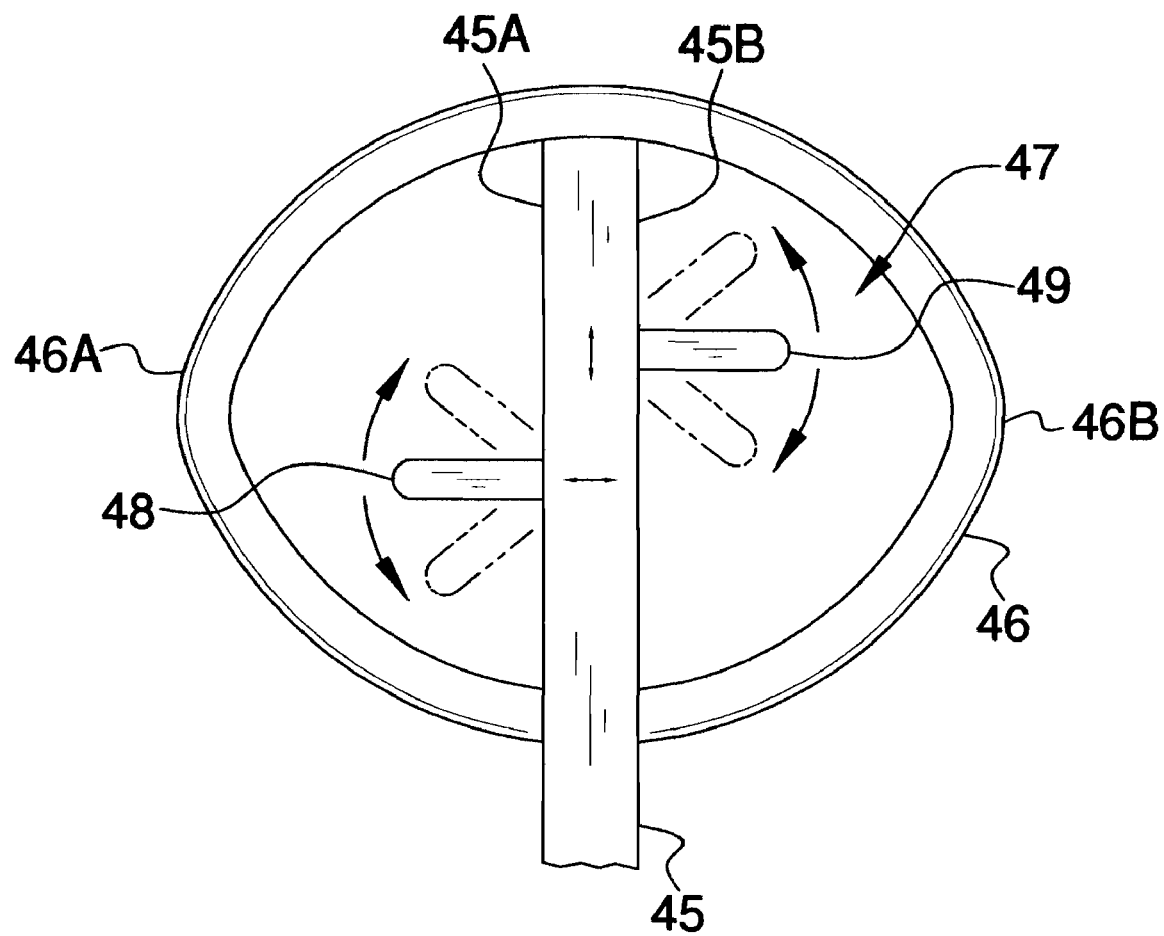
FIG. 4 is a front elevation view of the handle and controls.

Referring to FIG. 4, the stem 45 has a first side 45a spaced apart from a second side 45b. The oblong circular handle 46 is disposed upwardly on the stem support 44. The handle 46 is disposed laterally beyond each side of the stem 45. The handle 46 has a pair of spaced apart handle bulges comprising a first handle bulge 46a spaced laterally from the stem 45 first side 45a. The second handle bulge 46b is spaced laterally from the stem 45 second side 45b. The handle 46 and the bulges form a handle interior 47. The pair of movable control levers is disposed on the stem 45 within the handle interior 47.

The levers comprise a horizontal control lever 48 and a vertical control lever 49. The horizontal control lever 48 is in communication with the motor 32. The vertical control lever 49 is in communication with the hydraulic assembly 33. The handle interior 47 with bulges protects against inadvertent operation of the levers and also provides the most advantageous means of moving the apparatus 10 as needed, as the bulges provide greater lateral leverage for an operator of the apparatus 10. The bulges ensure that leveraging the apparatus 10 via the circular handle 46 does not present the levers in a position of inadvertent operation. The horizontal control lever 48 faces the first handle bulge 46a. The horizontal control lever 48 has an up position that selectively moves the forks laterally, a center neutral position, and a down position that moves the forks medially. The vertical control lever 49 faces the second handle bulge 46b. The vertical control lever 49 is in communication with the hydraulic cylinder assembly 33. The vertical control lever 49 has an up position that moves the trapezoidal header 20 and forks upwardly, a center neutral position, and a down position that moves the trapezoidal header 20 and forks downwardly.

With respect to the above description then, it is to be realized that the optimum dimensional relationships for the parts of the pallet jack apparatus, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the pallet jack apparatus.

Directional terms such as "front", "back", "in", "out", "downward", "upper", "lower", and the like may have been used in the description. These terms are applicable to the embodiments shown and described in conjunction with the drawings. These terms are merely used for the purpose of description in connection with the drawings and do not necessarily apply to the position in which the pallet jack apparatus may be used.

Therefore, the foregoing is considered as illustrative only of the principles of the pallet jack apparatus. Further, since numerous modifications and changes will readily occur to those skilled in the art, it is not desired to limit the pallet jack apparatus to the exact construction and operation shown and described, and accordingly, all suitable modifications and equivalents may be resorted to, falling within the scope of the pallet jack apparatus.

What is claimed is:

1. A pallet jack apparatus, comprising, in combination:
   a header having a front spaced apart from a rear, a top spaced apart from a bottom;
   a gear housing within the header;
   a pair of spaced apart slots within the header front, the slots adjacent to the header bottom, the slots comprising a first slot and a second slot;
   a motor vertically disposed within the gear housing, the motor proximal to the header bottom;
   a motor shaft extended vertically downward from the motor;
   a pinion gear affixed to the shaft;
   a pair of spaced apart forks comprising a first fork and a second fork;
   a first fork neck disposed rearwardly on a first fork first end, the first fork neck slideably disposed within the first slot of the header;
   a first fork gear disposed horizontally and medially on the first fork neck within the gear housing, the first fork gear engaged with the pinion gear in selective lateral adjustment of the first fork;
   a first fork rounded end disposed on the first fork, the first fork rounded end opposite the first fork first end;
   a second fork neck disposed rearwardly on a second fork first end, the second fork neck slideably disposed within the second slot of the header;
   a second fork gear disposed horizontally and medially on the second fork neck, the second fork gear engaged with the pinion gear in selective lateral adjustment of the second fork;
   a second fork rounded end disposed on the second fork, the second fork rounded end opposite the second fork first end;
   a pivot disposed on each fork, each pivot disposed rearwardly from each fork recess, the pivots comprising a first pivot on the first fork and a second pivot on the second fork;
   a pivot arm pivotally affixed to each pivot, comprising a first pivot arm affixed to the first pivot, a second pivot arm affixed to the second pivot;
   a first fork wheel disposed on an end of the first pivot arm opposite the first pivot;
   a second fork wheel disposed on an end of the second pivot arm opposite the second pivot;
   a header cap disposed atop the header, the header cap having a cap bottom, the header cap further comprising a rearwardly extended cap extension;
   a pair of spaced apart horizontally disposed platform supports slideably disposed against the rear of the header, the supports comprising a first support and a second support;
   a rear platform disposed between the platform supports;
   a battery disposed atop the rear platform, the battery adjacent to the header rear, the battery in electrical communication with the motor;
   a hydraulic cylinder assembly disposed atop the rear platform, the cylinder assembly rearward of the battery, the cylinder assembly further comprising a piston selectively driven upwardly, the piston engaged with the cap bottom of the cap extension;
   a wheel support affixed downwardly to the rear platform;
   a pair of spaced apart wheels affixed to the wheel support, the wheels comprising a first rear wheel and a second rear wheel;
   a stem support affixed rearwardly to the rear platform;
   a tubular stem disposed vertically within the stem support, the stem having a first side spaced apart from a second side;
   a handle disposed upwardly on the stem support, the handle disposed laterally beyond each side of the stem, the handle having a handle interior;
   a pair of movable control levers disposed on the stem within the handle interior, the levers comprising a horizontal control lever and a vertical control lever, the horizontal control lever in communication with the motor, the vertical control lever in communication with the hydraulic assembly, the horizontal control lever having an up position moving the forks laterally, a center neutral position, a down position moving the forks medially, the vertical control lever in communication with the hydraulic cylinder assembly, the vertical control lever having an up position moving the header and forks upwardly, a center neutral position, a down position moving the header and forks downwardly.

2. A pallet jack apparatus, comprising, in combination:
a trapezoidal header having a front spaced apart from a rear, a top spaced apart from a bottom;
a gear housing within the header;
a pair of spaced apart slots within the header front, the slots adjacent to the header bottom, the slots comprising a first slot and a second slot;
a motor vertically disposed within the gear housing, the motor proximal to the header bottom;
a motor shaft extended vertically downward from the motor;
a pinion gear affixed to the shaft;
a pair of spaced apart forks comprising a first fork and a second fork;
a first fork neck disposed rearwardly on a first fork first end, the first fork neck slideably disposed within the first slot of the trapezoidal header;
a first fork gear disposed horizontally and medially on the first fork neck within the gear housing, the first fork gear engaged with the pinion gear in selective lateral adjustment of the first fork;
a first fork rounded end disposed on the first fork, the first fork rounded end opposite the first fork first end;
a first fork recess disposed proximal to the first fork rounded end;
a second fork neck disposed rearwardly on a second fork first end, the second fork neck slideably disposed within the second slot of the trapezoidal header;
a second fork gear disposed horizontally and medially on the second fork neck, the second fork gear engaged with the pinion gear in selective lateral adjustment of the second fork;
a second fork rounded end disposed on the second fork, the second fork rounded end opposite the second fork first end;
a second fork recess disposed proximal to the second fork rounded end;
a pivot disposed on each fork, each pivot disposed rearwardly from each fork recess, the pivots comprising a first pivot on the first fork and a second pivot on the second fork;
a pivot arm pivotally affixed to each pivot, comprising a first pivot arm affixed to the first pivot, a second pivot arm affixed to the second pivot;
a first fork wheel disposed on an end of the first pivot arm opposite the first pivot;
a second fork wheel disposed on an end of the second pivot arm opposite the second pivot;
a header cap disposed atop the trapezoidal header, the header cap having a cap bottom, the header cap further comprising a rearwardly extended cap extension;
a pair of spaced apart horizontally disposed platform supports slideably disposed against the rear of the trapezoidal header, the supports comprising a first support and a second support;
a substantially diamond-shaped rear platform disposed between the platform supports;
a battery disposed atop the rear platform, the battery adjacent to the trapezoidal header rear, the battery in electrical communication with the motor;
a hydraulic cylinder assembly disposed atop the rear platform, the cylinder assembly rearward of the battery, the cylinder assembly further comprising a piston selectively driven upwardly, the piston engaged with the cap bottom of the triangular cap extension;
a wheel support affixed to the rear platform downwardly;
a pair of spaced apart wheels affixed to the wheel support, the wheels comprising a first rear wheel and a second rear wheel;
a stem support affixed rearwardly to the rear platform;
a tubular stem disposed vertically within the stem support, the stem having a first side spaced apart from a second side;
a handle disposed upwardly on the stem support;
a pair of movable control levers disposed upwardly on the stem, the levers comprising a horizontal control lever and a vertical control lever, the horizontal control lever in communication with the motor, the vertical control lever in communication with the hydraulic assembly, the horizontal control lever having an up position moving the forks laterally, a center neutral position, a down position moving the forks medially, the vertical control lever in communication with the hydraulic cylinder assembly, the vertical control lever having an up position moving the trapezoidal header and forks upwardly, a center neutral position, a down position moving the trapezoidal header and forks downwardly.

3. A pallet jack apparatus, comprising, in combination:
a trapezoidal header having a front spaced apart from a rear, a top spaced apart from a bottom;
a gear housing within the header;
a pair of spaced apart slots within the header front, the slots adjacent to the header bottom, the slots comprising a first slot and a second slot;
a motor vertically disposed within the gear housing, the motor proximal to the header bottom;
a motor shaft extended vertically downward from the motor;
a pinion gear affixed to the shaft;
a pair of spaced apart forks comprising a first fork and a second fork;
a first fork neck disposed rearwardly on a first fork first end, the first fork neck slideably disposed within the first slot of the trapezoidal header;
a first fork gear disposed horizontally and medially on the first fork neck within the gear housing, the first fork gear engaged with the pinion gear in selective lateral adjustment of the first fork;
a first fork rounded end disposed on the first fork, the first fork rounded end opposite the first fork first end;
a first fork recess disposed proximal to the first fork rounded end;
a second fork neck disposed rearwardly on a second fork first end, the second fork neck slideably disposed within the second slot of the trapezoidal header;
a second fork gear disposed horizontally and medially on the second fork neck, the second fork gear engaged with the pinion gear in selective lateral adjustment of the second fork;
a second fork rounded end disposed on the second fork, the second fork rounded end opposite the second fork first end;
a second fork recess disposed proximal to the second fork rounded end;
a pivot disposed on each fork, each pivot disposed rearwardly from each fork recess, the pivots comprising a first pivot on the first fork and a second pivot on the second fork;
a pivot arm pivotally affixed to each pivot, comprising a first pivot arm affixed to the first pivot, a second pivot arm affixed to the second pivot;
a first fork wheel disposed on an end of the first pivot arm opposite the first pivot;

a second fork wheel disposed on an end of the second pivot arm opposite the second pivot;

a header cap disposed atop the trapezoidal header, the header cap having a cap bottom, the header cap further comprising a rearwardly extended triangular cap extension;

a pair of spaced apart horizontally disposed platform supports slideably disposed against the rear of the trapezoidal header, the supports comprising a first support and a second support;

a substantially diamond-shaped rear platform disposed between the platform supports;

a battery disposed atop the rear platform, the battery adjacent to the trapezoidal header rear, the battery in electrical communication with the motor;

a hydraulic cylinder assembly disposed atop the rear platform, the cylinder assembly rearward of the battery, the cylinder assembly further comprising a piston selectively driven upwardly, the piston engaged with the cap bottom of the triangular cap extension;

a wheel support affixed to the rear platform downwardly;

a pair of spaced apart wheels affixed to the wheel support, the wheels comprising a first rear wheel and a second rear wheel;

a stem support affixed rearwardly to the rear platform;

a tubular stem disposed vertically within the stem support, the stem having a first side spaced apart from a second side;

an oblong circular handle disposed upwardly on the stem support, the handle disposed laterally beyond each side of the stem, the handle having a pair of spaced apart handle bulges comprising a first handle bulge spaced laterally from the stem first side, a second handle bulge space laterally from the stem second side, the handle and the bulges forming a handle interior;

a pair of movable control levers disposed on the stem within the handle interior, the levers comprising a horizontal control lever and a vertical control lever, the horizontal control lever in communication with the motor, the vertical control lever in communication with the hydraulic assembly, the horizontal control lever facing the first handle bulge, the horizontal control lever having an up position moving the forks laterally, a center neutral position, a down position moving the forks medially, the vertical control lever facing the second handle bulge, the vertical control lever in communication with the hydraulic cylinder assembly, the vertical control lever having an up position moving the trapezoidal header and forks upwardly, a center neutral position, a down position moving the trapezoidal header and forks downwardly.

* * * * *